(12) United States Patent
Mishra et al.

(10) Patent No.: US 9,098,589 B1
(45) Date of Patent: Aug. 4, 2015

(54) GEOGRAPHIC ANNOTATION OF ELECTRONIC RESOURCES

(75) Inventors: Arunesh Mishra, Sunnyvale, CA (US); Ravi Jain, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 12/952,341

(22) Filed: Nov. 23, 2010

(51) Int. Cl.
*G06F 17/30* (2006.01)

(52) U.S. Cl.
CPC .................................. *G06F 17/3087* (2013.01)

(58) Field of Classification Search
CPC .................... G06F 17/30241; G06F 17/30707; G06F 17/30864; G06F 17/3087
USPC ......... 707/743, 627, 628, 632, 705, 711, 723, 707/724, 737, 748, 921, 953, 918, 919, 707/999.104, 725, 741, 713, 715, 788, 722, 707/740
See application file for complete search history.

(56) References Cited

U.S. PATENT DOCUMENTS

| | | | |
|---|---|---|---|
| 6,363,392 B1 * | 3/2002 | Halstead et al. ........................ | 1/1 |
| 7,363,319 B2 * | 4/2008 | Cappellini ............................ | 1/1 |
| 8,176,027 B1 * | 5/2012 | Shuman et al. ................ | 707/706 |
| 2006/0074977 A1 * | 4/2006 | Kothuri et al. ............. | 707/104.1 |
| 2006/0229807 A1 | 10/2006 | Sheha et al. | |
| 2009/0082997 A1 * | 3/2009 | Tokman et al. ................ | 702/179 |
| 2009/0234825 A1 | 9/2009 | Xia et al. | |
| 2011/0320429 A1 * | 12/2011 | Doig et al. ..................... | 707/711 |
| 2012/0066066 A1 * | 3/2012 | Jain et al. .................... | 705/14.58 |
| 2012/0116678 A1 * | 5/2012 | Witmer .............................. | 702/5 |

* cited by examiner

*Primary Examiner* — Greta Robinson
(74) *Attorney, Agent, or Firm* — Marshall, Gerstein & Borun LLP

(57) ABSTRACT

Methods, systems, and apparatus, including computer programs encoded on a computer storage medium, for geographic annotation of electronic resources. In one aspect, a method includes generating a spatial index for a plurality of resources from a plurality of distinct publishers, including, for each resource of the plurality of resources: receiving a plurality of location data points for the resource, each location data point corresponding to one of a plurality of requests for the resource, and assigning each location data point for the resource to a spatial cluster of a plurality of spatial clusters, each spatial cluster corresponding to a particular geographic region. The spatial index is stored. The spatial index is used to identify a plurality of address locations for resources assigned to a spatial cluster corresponding to a first geographic region in response to a request from a requester to identify resources associated with the first geographic region.

29 Claims, 6 Drawing Sheets

GEOGRAPHIC ANNOTATION OF ELECTRONIC RESOURCES

BACKGROUND

This specification relates to annotating electronic resources with geographic information.

Electronic resources (e.g., web pages, documents, pictures, videos, and so on) can be associated with certain locations. The strength of the association can be quantified by assigning a score to an association between a resource and a location. For example, a web page for the New York Subway is likely more related to New York than it would be to Los Angeles. Additionally, that web page is typically more interesting to residents of and visitors to New York than it would be to people in Los Angeles, although it could be useful for someone in Los Angeles planning a trip to New York. Thus, the strength of association between the web page for the New York Subway and New York is stronger than with the location of Los Angeles.

The degree to which a resource is associated with, or related to, a particular location can be conventionally determined and quantified by direct analysis of the resource. For example, for the web page for the New York Subway, the number of appearances of the word "New York" can be counted and used to determine a relatedness score for the page. Similarly, techniques that mine keywords from images and videos can be used to attempt to determine the relatedness of those resources to locations.

SUMMARY

A computer system creates a spatial index associating resources with geographic regions. Resources are associated with geographic regions based on requests for the resources. Weights can be assigned to the associations, e.g., so that geographic regions having a large number of requests for a resource are weighted higher than geographic regions having a small number of requests for a resource.

In general, one aspect of the subject matter described in this specification can be embodied in methods that include the actions of generating a spatial index for a plurality of resources from a plurality of distinct publishers, including, for each resource of the plurality of resources: receiving a plurality of location data points for the resource, each location data point corresponding to one of a plurality of requests for the resource, and assigning each location data point for the resource to a spatial cluster of a plurality of spatial clusters, each spatial cluster corresponding to a particular geographic region; and storing the spatial index, wherein the spatial index is used to identify a plurality of address locations for resources assigned to a spatial cluster corresponding to a first geographic region in response to a request from a requester to identify resources associated with the first geographic region. Other embodiments of this aspect include corresponding systems, apparatus, and computer program products.

These and other embodiments can optionally include one or more of the following features. The requester is a local search service, and the local search service uses the address locations to boost one or more search results corresponding to one or more of the address locations for a user associated with the first geographic region. The requester is a user associated with the first geographic region. The requester is a service that builds a visual representation of the addressed resources overlaid on a map showing at least the first geographic region. The actions further include: in response to a request for regional information related to a particular resource in the plurality of resources, sending a plurality of identifiers of geographic regions corresponding to spatial clusters associated with the particular resource. The actions further include: for a particular resource in the plurality of resources, ranking the spatial clusters associated with the particular resource based on the number of location data points assigned to each spatial cluster. Ranking includes normalizing each spatial cluster according to a population associated with the geographic region corresponding to the spatial cluster. Assigning each location data point to a spatial cluster comprises using one of the following clustering techniques: k-means clustering, fuzzy c means clustering, and quality threshold clustering. A first location data point is annotated by a client system to a request for a resource. Receiving a plurality of location data points for the resource comprises receiving at least one location data point from a search system. The search system determined that a search result referencing the resource was selected by a user associated with the at least one location data point. Receiving a plurality of location data points for the resource comprises receiving at least one location data point from a publisher.

Particular embodiments of the subject matter described in this specification can be implemented so as to realize one or more of the following advantages. A resource can be associated with one or more locations or regions. The resource itself does not have to be directly analyzed in order to determine associated locations; consequently, the associated locations and regions can be determined for all resources regardless of their nature (web page, image, video, and so on).

Resources can be associated with various locations and regions. Each location associated with a resource can have a score indicating the strength of the association between the resource and the location. Given a certain region or location, associated resources can be identified and ranked. The associations can be used for various purposes, for example, improving local search results, building visual panoramic images of resources based on their associated locations, suggesting resources near a user, various analytics (e.g., determining interest in news articles), and so on. The associations can be used to create location-based news feeds. For example, news articles associated with a location can be distributed to users who have expressed interested in the location, for instance, using a Really Simple Syndication (RSS) news feed.

For a given resource associated with various geographic regions, two types of weights can be assigned to each region. First, a relative weight can be assigned that indicates the relative importance of one location versus another for the given resource. The relative weights of all the regions can be normalized so that they add up to a fixed value, e.g, one. Second, an absolute weight can be assigned that allows two regions to be compared for the relative strengths of their association with the resource. This is useful, for example, for applications that use local ranking.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
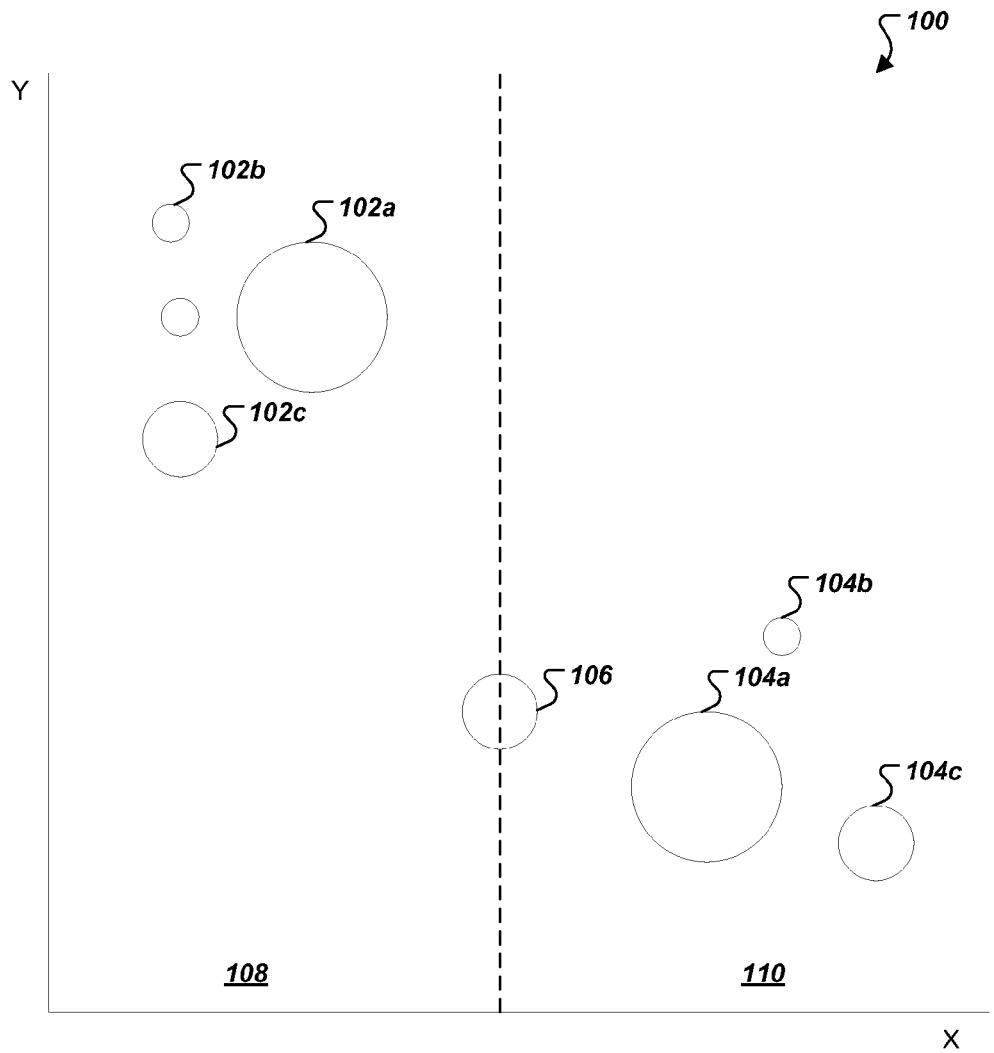
FIG. 1 shows an example map illustrating location data points associated with requests for a resource.

FIG. 1 shows an example map 100 illustrating location data points associated with requests for a resource. In general, each location data point represents a location of a user when the user sent a request for the resource. A circle (e.g., circle 102) on the map indicates a location data point for one request for the resource. The map illustrates two geographic regions, a left region 108 and a right region 110.

A location data point specifies a particular location (e.g., a pair of latitude and longitude coordinates) or a range of locations (e.g., a zip code including many city blocks). The size of a circle on the map 100 represents the size of the range of locations specified by the location data point indicated by the circle. For example, in the left region 108, the largest circle 102a can indicate a location data point for a city, the smallest circle 102b can indicate a location data point of a pair of latitude and longitude coordinates, and the middle sized circle 102c can represent a location data point of a particular zip code.

The requests for the resource are associated with different size ranges of locations because different location information is available for each request. For example, the request associated with the large circle 102a in the left region 108 can be from a user on a desktop computer, where the only location information is based on the Internet Protocol (IP) address of the desktop computer. In some implementations, the IP address is associated with a location identified as a city (or similar region). The request associated with the small circle 102b can correspond to a user on a mobile device that provides Global Positioning System (GPS) coordinates. The request associated with the middle sized circle 102c can be from a user on a WiFi network that is accessible over several city blocks. Various techniques can be used to determine a location data point for a request, and some of these techniques (e.g., cellular triangulation) are discussed further with reference to FIG. 3.

In some implementations, clustering techniques are used to assign each location data point to a spatial cluster corresponding to a geographic region. The circles 102a-c on the left are entirely within the region 108 on they left, so in typical clustering techniques, they are assigned to a spatial cluster for the left region 108. Similarly, the circles 104a-c on the right are assigned to a spatial cluster the right region 110.

The circle 106 in the middle straddles region 108 and region 110. Various clustering techniques can also be used to assign that circle 106 to a spatial cluster. Typically, because the circle 106 is closer in the Y direction to circles 104a-c, it would be assigned to a spatial cluster with those circles.

Although circles are used in FIG. 1 to illustrate the areas associated with particular location data points, various types of ranges of locations (geographic regions) are possible and could be illustrated using squares, rectangles, irregular shapes, and the like.

Figure 2:
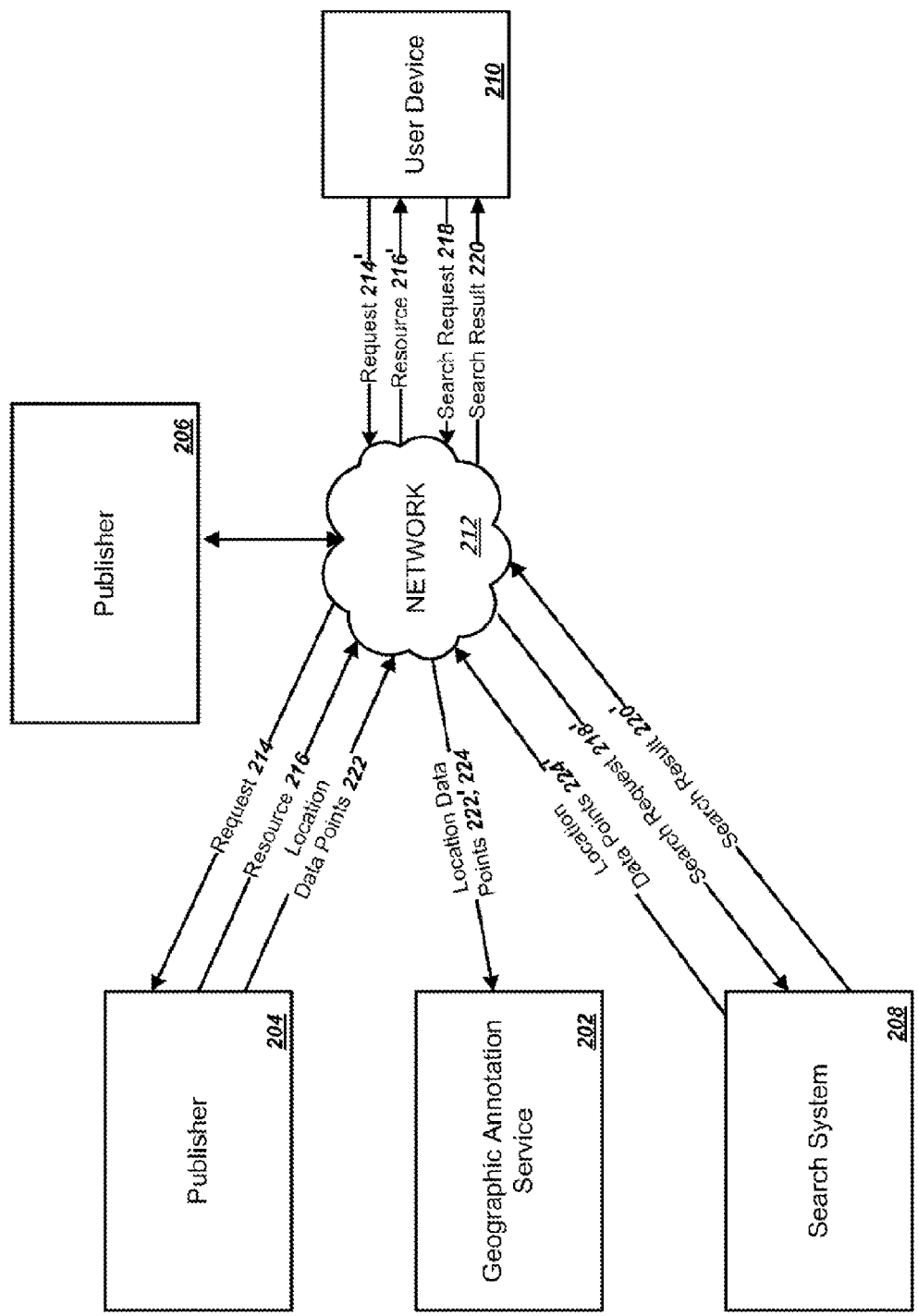
FIG. 2 is a block diagram illustrating an example geographic annotation service, publishers, a search service, and a user device.

FIG. 2 is a block diagram illustrating an example geographic annotation service 202, publishers 204 and 206, a search service 208, and a user device 210. In some implementations, the geographic annotation service 202, publishers 204 and 206, search service 208, and user device 210 communicate using a network 212, e.g., the Internet, a local area network (LAN), a wide area network (WAN), or a combination of them.

A publisher is any web site that hosts and provides electronic access to one or more resources. A web site is generally a collection of one or more resources associated with a domain name. An example web site is a collection of web pages formatted in hypertext markup language (HTML) that contains text, graphic images, multimedia content, and programming elements, such as scripts.

Resources can be HTML pages, word processing documents, portable document format (PDF) documents, images, videos, feed sources, and the like. The resources may include content, e.g., text, pictures, and other media content. Resources may also include embedded information, e.g., meta (or metadata) information and hyperlinks and/or embedded instructions (e.g., JavaScript scripts).

An Internet addressable resource can be identified by a uniform resource identifier (URI), which can be a universal resource locator (URL) that can be used as an Internet address (a network location) of the resource.

A user device 210 is an electronic device that is under control of a user and is capable of requesting and receiving resources over the network 212. Example user devices 210 include personal computers, laptop computers, mobile communication devices (e.g., smart phones and personal digital assistants), and other devices that can send and receive data over the network 212. A user device 212 typically includes a user application, e.g., a web browser, to facilitate the sending and receiving of data over the network 212.

User devices 210 sends requests 214 for resources to the publishers 204 and 206, and the publishers 204 and 206 return resources 216 in response to the requests 214. The publishers 204 and 206 can use a request 214 to determine a location data point for the requested resource. Processes for a publisher to determine a location data point from a requested resource are described below with reference to FIG. 3. The publishers 204 and 206 can submit location data points 222 to the geographic annotation service 202.

The search system 208 includes a search engine. The system includes a crawler that identifies resources by crawling the accessible resources of publishers 204 and 206 and indexing the resources.

The user device 210 submits search requests 218 to the search system 208. In response to each request, the search system 208 identifies resources that the search engine determines to be responsive to the query in the search request. The search system 208 generates search results 220 that identify the responsive resources, and returns the search results 220 to the user device 210. A search result 220 identifies a resource that was determined to be responsive to the query and includes a resource locator for the resource (generally in a hyperlink). An example search result 220 for a web page can include a title, a snippet (or portion) of text extracted from the web page, and the URL of the web page.

In some implementations, the search system 208 uses a search request 218 to determine a location data point for a resource, e.g., a resource identified as responsive to a query. Example processes for a search system 208 to perform to determine a location data point for a resource are described below with reference to FIG. 4. The search system 208 can submit location data points 224 to the geographic annotation service 202.

The geographic annotation service 202 receives location data points 222 and 224 for resources. The geographic annotation service 202 assigns each location data point for a resource to a spatial cluster corresponding to a geographic region. Assigning a location data point for a resource to a spatial cluster is discussed above with reference to FIG. 1 and further below with reference to FIG. 5.

In some implementations, the geographic annotation service 202 receives requests to identify resources associated with a particular geographic region. In response, the geographic annotation service 202 provides a group of address locations for resources assigned to the spatial cluster corresponding to the particular geographic region.

Figure 3:
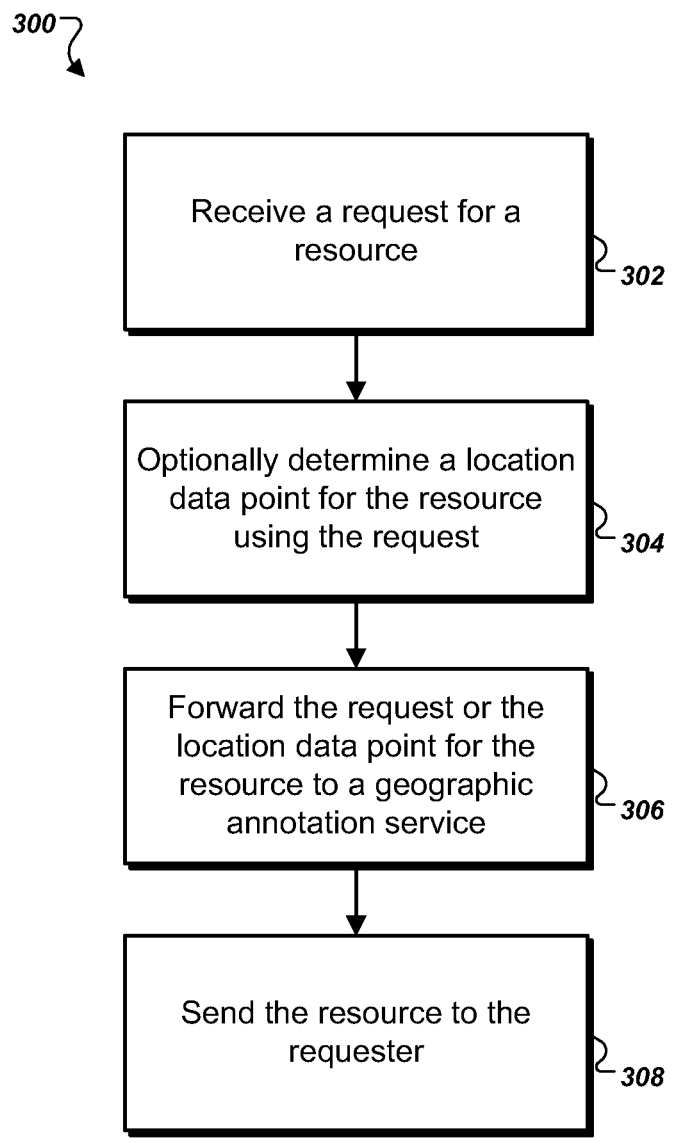
FIG. 3 is a flow diagram of an example process for providing location information for a request for a resource to a geographic annotation service.

FIG. 3 is a flow diagram of an example process 300 for providing location information for a request for a resource to a geographic annotation service (e.g., geographic annotation service 202). For convenience, the process 300 will be described with respect to a system including one or more computing devices that performs the process 300. In some implementations, the process 300 is performed by a server system associated with a publisher (e.g., one of publishers 204 and 206).

The system receives 302 a request for a resource. The request is from a user device (e.g., user device 210) at a location. For example, the request can be received from a mobile device in response to an action by a user, from a desktop computer, or other device though a particular application, e.g., through a web browser on the user device.

In some implementations, the system determines 304 a location data point for the resource using the request. The location data point can be determined using various techniques. For example, if the user device is a mobile device, WiFi or Cell ID-based localization can be used to estimate the location of the user device. WiFi localization involves determining an identifier for a WiFi device (typically a wireless router) and using the identifier to determine a location for the WiFi device (e.g., by comparing the identifier to a list of known identifiers and locations). Cell ID-based localization involves identifying a cellular signal provider (typically an antenna tower) and determining the location of the signal provider. In those cases, the radio signals, a list of WiFi access points (APs), or a list of cellular base-stations can be included with the request for the resource.

In another example, some mobile devices can directly provide location information from a GPS receiver within the mobile device. Some mobile devices include location information with the request, for example, using a web browser, plug-ins installed in the browser, or through web-page based functionalities, e.g., JavaScript components.

In some implementations, the system determines the location data point by tracking user information. For example, if the request for the resource came from a user device with a known user (e.g., where the user has logged into a service), then the location data point can be based on information determined from information provided by the user (e.g., by analyzing the user's search history, or user information provided when signing up for a user service).

In some implementations, the system determines a relevance measure for the request. In some of those implementations, the relevance measure is based on an amount of time that the user device reports the user spent viewing or interacting with the resource. For example, if the resource is a video, the relevance measure can be based on the amount of time the video was actually played on the user device, or on the fraction of the total time of the video that was streamed to the user device. In some implementations, the system determines the relevance measure so that individual user data is not identifiable to protect users' privacy.

To allow users to indicate whether the system is allowed to utilize user information as discussed herein, appropriate controls may be provided on a per-application and/or per-function basis.

In some other implementations, the relevance measure is based on explicit feedback from users. For example, the publisher can provide a web page to a user device asking, "how helpful [or useful, relevant, or the like] was this for your city [or town, location, or the like]?" A user at the user device can provide a rating for the relevance of the resource to the user's location. In some implementations, the resource is sent to trusted human raters (e.g., paid persons or volunteers) who provide explicit feedback about the relevance of a resource to a geographic region. This quickly provides data for a newly published resource.

In implementations where the location data point is determined, the system sends 306 the location data point to a geographic annotation service (e.g., geographic annotation service 202 of FIG. 2). Where a relevance measure is determined, the system also provides the relevance measure to the geographic annotation service. In some other implementations, the request is sent to the geographic annotation service, and the geographic annotation service determines the location data point and optionally a relevance measure using the request (e.g., in a similar manner as described above).

The system sends 308 the requested resource to the requestor. For example, the system can send the requested resource to the user device for display on the user's browser. Alternatively, the requested resource can be downloaded to the user device, for example, as a file.

Figure 4:
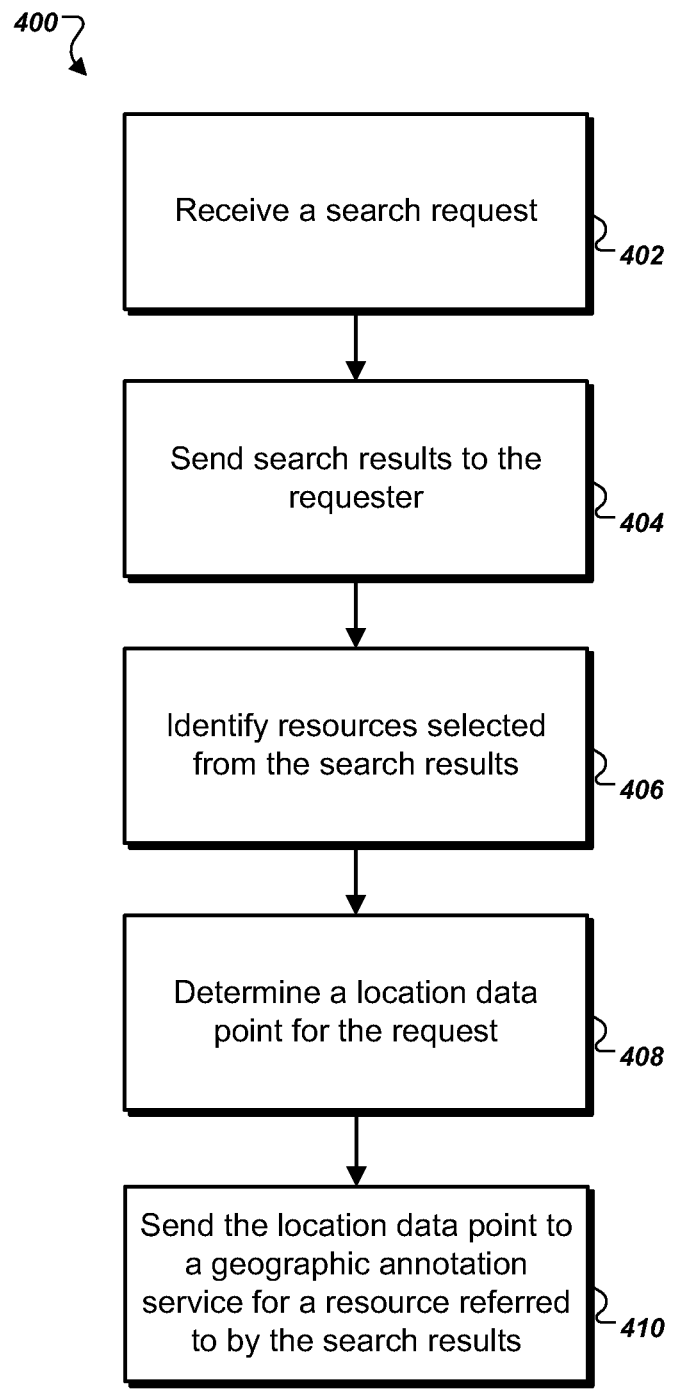
FIG. 4 is a flow diagram of an example process for providing location information for a request for a resource to a geographic annotation service.

FIG. 4 is a flow diagram of an example process 400 for providing location information for a request for a resource to a geographic annotation service (e.g., geographic annotation service 202). For convenience, the process 400 will be described with respect to a system including one or more computing devices that performs the process 400. In some implementations, the process 400 is performed by a server associated with a search system (e.g., search system 208).

The system receives 402 a search request. The search request is from a user device at a location. The system provides 404 search results are to the requesting user device (step 404). For example, the search results can be provided to a browser application on the user device for display. The search results are obtained from a search engine, e.g., that is part of the search system.

The system identifies 406 resources selected from the search results. In some implementations, the search results provided to the requesting user device include indirect references to the resources. For example, a search result provided to the user device can include an initial URL that initially directs the user device to the search system. The appearance of the initial URL can be hidden. Thus, for a search result "www.example.com," an example initial URL is http://www.searchsystem.com/redirect/www.example.com. The search result can still be presented on the user device as "www.example.com."

When the user device requests that initial URL, the search system determines that the resource referred to by that search result has been selected. The search system can then redirect the user device to the resource referred to by the search result, e.g., by providing a direct URL for the resource. Continuing the above example, the search system can send the user device the direct URL http://www.example.com.

In some implementations, the system determines 408 a location data point for the search request. The system can determine the location data point using the techniques discussed with respect to step 304 of FIG. 3.

In some implementations, the system determines a relevance measure for the location data point. For example, the relevance measure can be based on whether the selection of the search result was a "long click" or a "short click." A click is a type of selection or interaction and can be, for example, a physical click, a gesture on a touch pad, a shake of a mobile device, and so on. In some implementations, the search service observes user behavior data including "click data". Click data indicates how long a user interacts with a resource result after selecting it from the search results. For example, a longer time spent viewing a resource (e.g., greater than 1 minute), termed a "long click", can indicate that a user found the resource to be relevant for the user's search request. A brief period viewing an image (e.g., less than 30 seconds), termed a "short click", can be interpreted as a lack of relevance.

In implementations where the location data point is determined, the system sends 410 the location data point to a geographic annotation service (e.g., geographic annotation service 202 of FIG. 2). The geographic annotation service associates the location data point with either a selected resource or one or more resources referred to by the search results (e.g., the top three search results). Where a relevance measure is determined, the system also sends the relevance measure to the geographic annotation service. In some other implementations, where the location data point has not been determined, the system sends the search request to the geographic annotation service, which can then determine the location data point using the search request.

Figure 5:
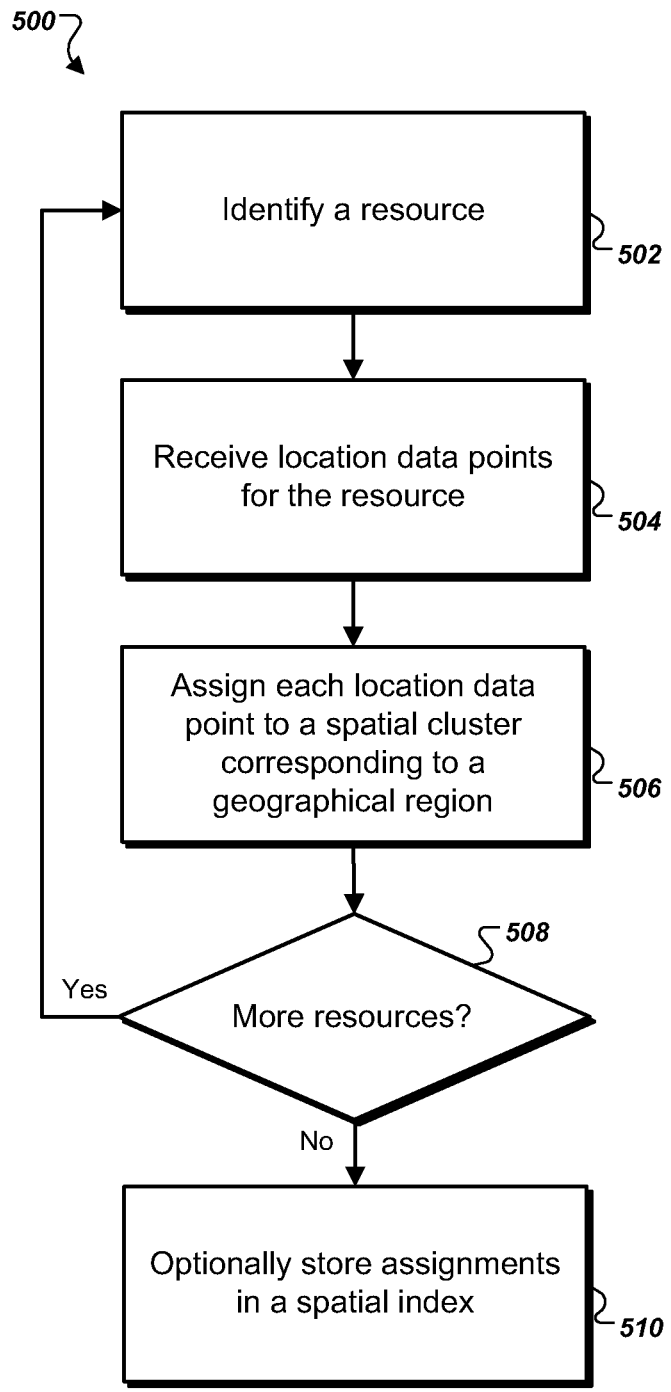
FIG. 5 is a flow diagram of an example process for annotating resources with geographic information.

FIG. 5 is a flow diagram of an example process 500 for annotating resources with geographic information. For convenience, the process 500 will be described with respect to a system including one or more computing devices that performs the process 500. In some implementations, the process 500 is performed by a server associated with a geographic annotation service (e.g., geographic annotation service 202).

The system identifies 502 a resource to be annotated from a collection of one or more resources. The resources or address locations for the resources can be received from, e.g., a search system (e.g., search system 208). The system receives 504 location data points for each resource, and assigns 506 each location data point to a spatial cluster corresponding to a geographic region as described above with respect to FIG. 1. The resources can be published by various distinct publishers and optionally indexed by a search service. This results in a spatial index that can be used to provide address locations for resources associated with a geographic regions and to provide identifiers for geographic regions associated with a resource.

The system identifies 502 a resource to be annotated, for example, according to a reference to the resource (e.g., a URL). In some scenarios, the reference to the resource is received from a publisher (e.g., publisher 204). In some other scenarios, the reference is received from a search system (e.g., search system 208).

The system receives 504 the location data points from publishers, a search system, or both. Publishers can provide location data points, for example, according to the process 300 illustrated in FIG. 3. Search systems can provide location data points, for example, according to the process 400 illustrated in FIG. 4. In some implementations, instead of receiving location data points, the system receives requests for the resource and search requests for the resource. In those implementations, a location data point is determined for each request for the resource or search request.

The system assigns 506 each location data point to a spatial cluster corresponding to a geographic region. Assigning a location data point to a spatial cluster is discussed with respect to FIG. 1. Clustering involves organizing objects into different groups based on characteristics of the objects. Various clustering techniques are possible, for example, k-means clustering, fuzzy c-means clustering, and quality threshold cluster can be used. Taken together, the assigned location data points for the resources constitute a spatial index of resources and geographic regions. For a given geographic region, resources can be ranked based on, for example, the number location data points assigned to the geographic region's spatial cluster for each resource.

Similarly, for a given resource, geographic regions can be ranked using the number of location data points assigned to the region's corresponding spatial cluster. In some implementations, ranking geographic regions for a particular resource includes normalizing each spatial cluster according to a population associated with the geographic region corresponding to the spatial cluster. For example, if 1000 requests are received from both City A and City B, but City A has twice the population than City B, then City B is likely more related to the resource than City A even though the same number of requests are received from each city. Normalization can also be based on the proportion of requests received for each geographic region from the total number of requests received for the resource.

In some implementations, a relevance measure is received for the location data point. In some of those implementations, the relevance measure is used to exclude some location data points from being assigned to a spatial cluster. For example, if the relevance measure fails to exceed a threshold relevance measure, then the location data point can be excluded (e.g., if a request for a video only resulted in 1% of the video being streamed to a client device, then the location data point for that request can be excluded).

In some implementations, the relevance measure is used to rank resources for a geographic region, or to rank geographic regions for a resource. For example, when ranking resources for a given region, the number and relevance of location data points assigned to the spatial cluster for the region can be considered.

In some implementations, the relevance measure is also associated with a time, e.g., a time of day or range of dates. For example, in some implementations, each location data point for a resource is associated with a time and date for the corresponding request for the resource. Rankings of resources for a geographic region, or geographic regions for a resource, can be based on time of day or days of the year.

In some implementations, the spatial index is used to determine local information affinities, or "sister cities." For example, if regions A and B have roughly similar proportions of requests to a resource, they have a local information affinity to that resource. If A and B have a local information affinity for enough resources (e.g., more than a threshold number of resources), an "interest affinity" can be inferred between the two regions. This could be used as a recommendation signal. For example, if users in A like certain resources, then users in B might also like those resources even if they have been requested infrequently from users in B. The recommendation signal can be sent, for example, to publishers or a search service.

The system determines 508 whether more resources are to be annotated. If more resources are to be annotated, then the process 500 is repeated for those resources (e.g., when a publisher publishes a new resource). If no more resources are to be annotated, the system optionally stores the assigned location data points to a spatial index.

Figure 6A:
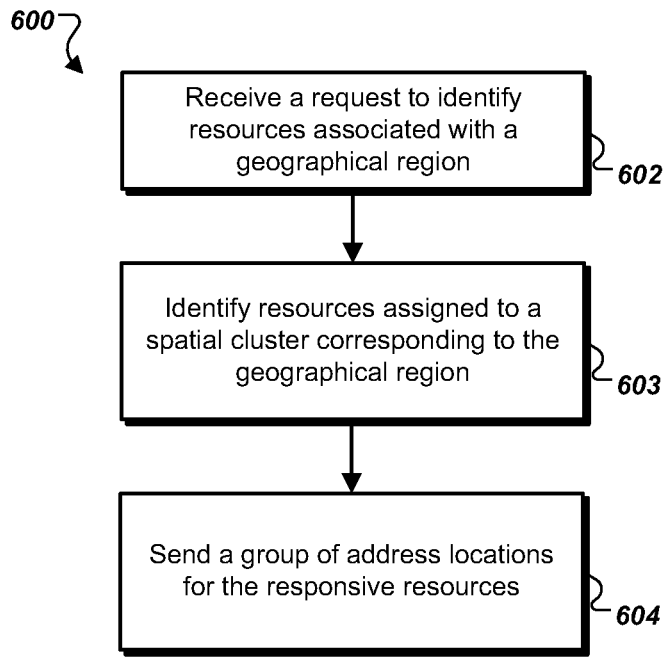
FIG. 6A is a flow diagram of an example process for using a spatial index to determine resources associated with a geographic region.

FIG. 6A is a flow diagram of an example process 600 for using a spatial index to determine resources associated with a geographic region. For convenience, the process 600 will be described with respect to a system including one or more computing devices that performs the process 600. In some implementations, the process 600 is performed by a server associated with a geographic annotation service (e.g., geographic annotation service 202).

The system receives 602 a request to identify resources associated with a geographic region. The request is from a requester, for example, a local search service or a user device (e.g., a mobile device located in the geographic region). A local search service is a search service that provides search results related to specified locations. The request can specify a number of resources to be identified.

The system identifies 603 resources assigned to a spatial cluster corresponding to the geographical region. The system sends 604 a group of address locations for the identified resources to the requester. The resources can be ranked as described with respect to FIG. 5.

In some implementations, the group of address locations for resources is sent to a local search service. The local search service uses the address locations to adjust a score for one or more search results corresponding to one or more of the address locations for a user associated with the geographic region. For example, when a user in California submits a search request to a local search service, search results that reference resources that are more related to California can be boosted over search results that reference resources that are less related to California.

In some implementations, the group of address locations is sent to a service that builds a visual representation of the referenced resources overlaid on a map showing at least the geographic region. For example, if the resources are images, the service can build a map showing each image over the geographic region most related to the image (e.g., the region having the most location data points assigned to its spatial cluster).

In some implementations, the request is for global resources. Resources are global where requests for the resource do not exhibit strong locality (e.g., high numbers of location data points assigned to the same spatial cluster). Resources can be globally "famous" where they have a high total number of requests but those requests are distributed over a variety of geographic regions. In some of these implementations, address locations for global resources are sent to a search system (e.g., search system 208) so that global resources can be preferred for search results when there is no location associated with a search request.

In some implementations, the request is from a user in a geographic region who is looking for pages related to the user's current location. The user can send the request using a web page for "pages near you" or similar. A list of web pages can be sent to the user for web pages most related to the user's location. This is useful, for example, for users who are interested in viewing pages that have a strong association with a particular location, e.g., a place of recreation, or a business or a place of historic interest. In some implementations, the request is from a user traveling to (or otherwise interested in) a location different from the user's current location.

In some implementations, the request is from a local proxy system for a cellular network. Some cellular network providers use a local proxy system for faster web access, e.g., by mobile devices. The local proxy system caches resources at a computer system physically close to a cellular base station, e.g., to minimize the number of times the computer system has to request those resources. The local proxy system can determine resources associated with a geographic region including the cellular base station and cache those resources in an attempt to predict what resources will be requested at the cellular base station. Alternatively, the local proxy system can cache resources on other computer systems, for example, directly on a mobile device, or at a wireless router for a WiFi network.

Figure 6B:
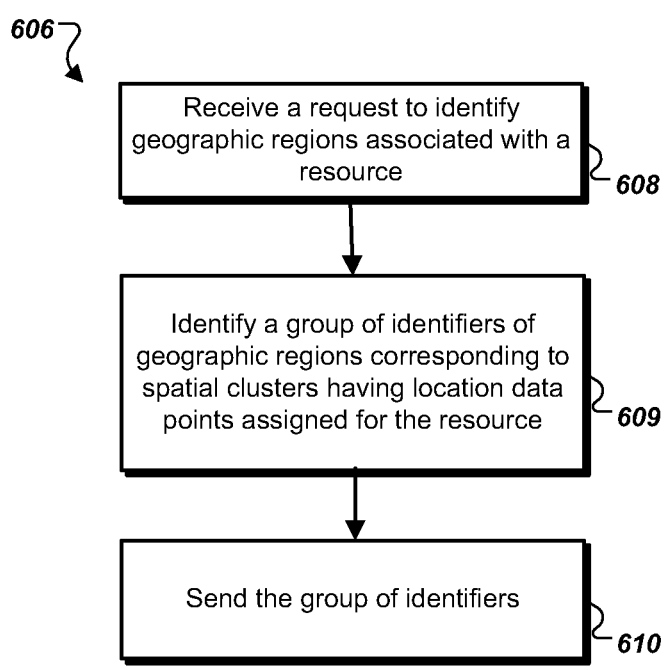
FIG. 6B is a flow diagram of an example process for using a spatial index to determine geographic regions associated with a resource.

FIG. 6B is a flow diagram of an example process 606 for using a spatial index to determine geographic regions associated with a resource. For convenience, the process 606 will be described with respect to a system including one or more computing devices that performs the process 606. In some implementations, the process 606 is performed by a server associated with a geographic annotation service (e.g., geographic annotation service 202).

The system receives 608 a request to identify geographic regions associated with a resource. The system identifies 609 a group of identifiers of geographic regions corresponding to spatial clusters having location data points assigned for the resource (e.g., by ranking the spatial clusters corresponding to the geographic regions as discussed with respect to FIG. 5). The system sends 610 the group of identifiers to the requester.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
  receiving, by one or more processors, from an electronic device of a user, a query for a resource;
  sending, by one or more processors, to the electronic device of the user, a search result corresponding to the resource;
  receiving, by one or more processors, a location data point, wherein the location data point corresponds to a geographic location of a user at or near a time when the user submitted a request for a resource, wherein the request for the resource is received by either:
    receiving, by one or more processors, an indication of the user submitting, using the electronic device, the query for the resource, and wherein the location data point corresponds to a geographic location of the electronic device at or near the time when the user submits the request for the resource, or
    receiving, by one or more processors, an indication of the user selecting, using the electronic device, the search result corresponding to the resource and wherein the location data point corresponds to a geographic location of the electronic device at or near the time when the user selects the search result corresponding to the resource;
  identifying, by the one or more processors, a spatial cluster of a spatial index that corresponds to the location data point, the spatial cluster corresponding to a geographic region; and
  updating, by the one or more processors, the spatial index to associate the resource with the identified spatial cluster such that the resource is associated with the spatial cluster corresponding to the geographic location of the user at or near the time when the user submitted the request for the resource.

2. The method of claim 1, wherein submitting a request for the resource comprises the user submitting, using an electronic device, a query for the resource, and wherein the location data point corresponds to a geographic location of the electronic device at or near the time when the user submits the request for the resource.

3. The method of claim 1, wherein submitting a request for the resource comprises the user selecting, using an electronic device, a search result corresponding to the resource and wherein the location data point corresponds to a geographic location of the electronic device at or near the time when the user selects the search result corresponding to the resource.

4. The method of claim 1, further comprising:
  receiving, from a requestor, a request to identify resources associated with the geographic region;
  identifying spatial clusters of the spatial index that correspond to the geographic region, the identified spatial clusters including the spatial cluster associated with the resource requested by the user;
  identifying resources associated with the spatial clusters, the identified resources including the resource requested by the user; and
  providing, to the requestor, the resources identified as being associated with the spatial clusters.

5. The method of claim 1, further comprising:
  receiving, from a requestor, a request to identify geographic regions associated with the resource requested by the user;
  identifying spatial clusters of the spatial index that correspond to the resource requested by the user, the identified spatial clusters including the spatial cluster associated with the resource requested by the user;
  identifying geographic regions corresponding to the identified spatial clusters, the identified geographic regions including the geographic region corresponding to the spatial cluster associated with the resource requested by the user; and
  providing, to the requestor, the geographic regions identified as corresponding to the identified spatial clusters.

6. The method of claim 1, further comprising receiving a relevance measure corresponding to user interaction with content corresponding to the requested resource.

7. The method of claim 6, wherein the relevance measure corresponds to a length of time the user interacts with the content corresponding to the requested resource.

8. The method of claim 6, further comprising:
  determining that the relevance measure satisfies a relevance measure threshold; and
  in response to determining that the relevance measure satisfies a relevance measure threshold, updating the spatial index to associate the resource with the identified spatial cluster.

9. The method of claim 1, further comprising:
  receiving a second location data point corresponding to a second geographic location of a user at a time when the user submits a request for a second resource;
  receiving a relevance measure corresponding to the user's interaction with content corresponding to the second resource;
  determining that the relevance measure does not satisfy a relevance measure threshold; and
  in response to determining that the relevance measure does not satisfy a relevance measure threshold, not updating the spatial index to associate the second resource with a spatial cluster based at least in part on the second location data point.

10. The method of claim 1, wherein the location data point is received from a search server, wherein the search server:
  receives a search request from the user;
  serves a set search results responsive to the search request;
  identifies user selection of a search result of the set of search results; and
  determines the geographic location of the user at or near the time the user selects the search result,
  wherein the location data point corresponds to the determined geographic location of the user at or near the time the user selects the search result.

11. The method of claim 1, wherein the location data point is received from a content server, wherein the content server:
  receives a request for the resource from the user;
  determines the geographic location of the user at or near the time of the request; and
  serves content corresponding to the resource,
  wherein the location data point corresponds to the determined geographic location of the user at or near the time of the request.

12. The method of claim 1, further comprising:
  receiving, by the one or more processors and from a client user device via an electronic communications network, a request for a resource, wherein the request is submitted by a user using the client device, wherein the location data point corresponds to a geographic location of the client device at or near a time when the user submitted the request for the resource using the client device, such that the resource is associated with the spatial cluster corresponding to the geographic location of the user at or near the time when the user submitted the request for the resource using the client device.

13. A system comprising:

one or more memories storing instructions; and one or more processors coupled to the one or more memories and configured to execute the instructions stored thereon to perform the following steps:

receiving from an electronic device of a user, a query for a resource;

sending to the electronic device of the user, a search result corresponding to the resource;

receiving a location data point, wherein the location data point corresponds to a geographic location of a user at or near a time when the user submitted a request for a resource, wherein the request for the resource is received by either:

receiving an indication of the user submitting, using the electronic device, the query for the resource, and wherein the location data point corresponds to a geographic location of the electronic device at or near the time when the user submits the request for the resource, or receiving an indication of the user selecting, using the electronic device, the search result corresponding to the resource and wherein the location data point corresponds to a geographic location of the electronic device at or near the time when the user selects the search result corresponding to the resource;

identifying a spatial cluster of a spatial index that corresponds to the location data point, the spatial cluster corresponding to a geographic region; and updating the spatial index to associate the resource with the identified spatial cluster such that the resource is associated with the spatial cluster corresponding to the geographic location of the user at or near the time when the user submitted the request for the resource.

14. The system of claim 13, wherein submitting a request for the resource comprises the user submitting, using an electronic device, a query for the resource, and wherein the location data point corresponds to a geographic location of the electronic device at or near the time when the user submits the request for the resource.

15. The system of claim 13, wherein submitting a request for the resource comprises the user selecting, using an electronic device, a search result corresponding to the resource and wherein the location data point corresponds to a geographic location of the electronic device at or near the time when the user selects the search result corresponding to the resource.

16. The system of claim 13, the steps further comprising:

receiving, from a requestor, a request to identify resources associated with the geographic region;

identifying spatial clusters of the spatial index that correspond to the geographic region, the identified spatial clusters including the spatial cluster associated with the resource requested by the user;

identifying resources associated with the spatial clusters, the identified resources including the resource requested by the user; and providing, to the requestor, the resources identified as being associated with the spatial clusters.

17. The system of claim 13, the steps further comprising:

receiving, from a requestor, a request to identify geographic regions associated with the resource requested by the user;

identifying spatial clusters of the spatial index that correspond to the resource requested by the user, the identified spatial clusters including the spatial cluster associated with the resource requested by the user;

identifying geographic regions corresponding to the identified spatial clusters, the identified geographic regions including the geographic region corresponding to the spatial cluster associated with the resource requested by the user; and providing, to the requestor, the geographic regions identified as corresponding to the identified spatial clusters.

18. The system of claim 13, the steps further comprising receiving a relevance measure corresponding to user interaction with content corresponding to the requested resource.

19. The system of claim 18, wherein the relevance measure corresponds to a length of time the user interacts with the content corresponding to the requested resource.

20. The system of claim 18, the steps further comprising:

determining that the relevance measure satisfies a relevance measure threshold; and in response to determining that the relevance measure satisfies a relevance measure threshold, updating the spatial index to associate the resource with the identified spatial cluster.

21. The system of claim 13, the steps further comprising:

receiving a second location data point corresponding to a second geographic location of a user at a time when the user submits a request for a second resource;

receiving a relevance measure corresponding to the user's interaction with content corresponding to the second resource;

determining that the relevance measure does not satisfy a relevance measure threshold; and in response to determining that the relevance measure does not satisfy a relevance measure threshold, not updating the spatial index to associate the second resource with a spatial cluster based at least in part on the second location data point.

22. The system of claim 13, wherein the location data point is received from a search server, wherein the search server:

receives a search request from the user;

serves a set search results responsive to the search request;

identifies user selection of a search result of the set of search results; and determines the geographic location of the user at or near the time the user selects the search result, wherein the location data point corresponds to the determined geographic location of the user at or near the time the user selects the search result.

23. The system of claim 13, wherein the location data point is received from a content server, wherein the content server:

receives a request for the resource from the user;

determines the geographic location of the user at or near the time of the request; and serves content corresponding to the resource, wherein the location data point corresponds to the determined geographic location of the user at or near the time of the request.

24. The system of claim 13, wherein the steps further comprise:
receiving, from a client user device via an electronic communications network, a request for a resource, wherein the request is submitted by a user using the client device,
wherein the location data point corresponds to a geographic location of the client device at or near a time when the user submitted the request for the resource using the client device,
such that the resource is associated with the spatial cluster corresponding to the geographic location of the user at or near the time when the user submitted the request for the resource using the client device.

25. A non-transitory computer readable medium comprising program instructions stored thereon that are executable by a processor to cause the following steps:
receiving from an electronic device of a user, a query for a resource;
sending to the electronic device of the user, a search result corresponding to the resource;
receiving a location data point, wherein the location data point corresponds to a geographic location of a user at or near a time when the user submitted a request for a resource, wherein the request for the resource is received by either:
receiving an indication of the user submitting, using the electronic device, the query for the resource, and wherein the location data point corresponds to a geographic location of the electronic device at or near the time when the user submits the request for the resource, or
receiving an indication of the user selecting, using the electronic device, the search result corresponding to the resource and wherein the location data point corresponds to a geographic location of the electronic device at or near the time when the user selects the search result corresponding to the resource;
identifying a spatial cluster of a spatial index that corresponds to the location data point, the spatial cluster corresponding to a geographic region; and
updating the spatial index to associate the resource with the identified spatial cluster such that the resource is associated with the spatial cluster corresponding to the geographic location of the user at or near the time when the user submitted the request for the resource.

26. The medium of claim 25, wherein the steps further comprise:
receiving, from a client user device via an electronic communications network, a request for a resource, wherein the request is submitted by a user using the client device,
wherein the location data point corresponds to a geographic location of the client device at or near a time when the user submitted the request for the resource using the client device,
such that the resource is associated with the spatial cluster corresponding to the geographic location of the user at or near the time when the user submitted the request for the resource using the client device.

27. A server system communicatively coupled to a client user device via an electronic communications network, wherein the server system comprises:
one or more memories storing instructions; and
one or more processors coupled to the one or more memories and configured to execute the instructions stored thereon to perform the following steps:
receiving, from the client user device, a request for a resource, wherein the request is submitted by a user using the client device;
identifying a location data point, wherein the location data point corresponds to a geographic location of the client device at or near a time when the user submitted the request for the resource using the client device;
identifying a spatial cluster of a spatial index that corresponds to the location data point, wherein the spatial cluster corresponds to a geographic region; and
updating the spatial index to associate the resource with the identified spatial cluster such that the resource is associated with the spatial cluster corresponding to the geographic location of the user at or near the time when the user submitted the request for the resource using the client device.

28. A computer-implemented method comprising:
receiving, by one or more processors, a location data point, wherein the location data point corresponds to a geographic location of a user at or near a time when the user submitted a request for a resource, wherein the location data point is received from a content server, wherein the content server:
receives a request for the resource from the user;
determines the geographic location of the user at or near the time of the request; and
serves content corresponding to the resource,
wherein the location data point corresponds to the determined geographic location of the user at or near the time of the request;
identifying, by the one or more processors, a spatial cluster of a spatial index that corresponds to the location data point, the spatial cluster corresponding to a geographic region; and
updating, by the one or more processors, the spatial index to associate the resource with the identified spatial cluster such that the resource is associated with the spatial cluster corresponding to the geographic location of the user at or near the time when the user submitted the request for the resource.

29. A system comprising:
one or more memories storing instructions; and
one or more processors coupled to the one or more memories and configured to execute the instructions stored thereon to perform the following steps:
receiving a location data point, wherein the location data point corresponds to a geographic location of a user at or near a time when the user submitted a request for a resource, wherein the location data point is received from a search server, wherein the search server:
receives a search request from the user;
serves a set search results responsive to the search request;
identifies user selection of a search result of the set of search results; and
determines the geographic location of the user at or near the time the user selects the search result,
wherein the location data point corresponds to the determined geographic location of the user at or near the time the user selects the search result;
identifying a spatial cluster of a spatial index that corresponds to the location data point, the spatial cluster corresponding to a geographic region; and
updating the spatial index to associate the resource with the identified spatial cluster such that the resource is associated with the spatial cluster corresponding to the geographic location of the user at or near the time when the user submitted the request for the resource.

* * * * *